United States Patent Office 3,278,520
Patented Oct. 11, 1966

3,278,520
HYDROXYPROPYL CELLULOSE AND PROCESS
Eugene D. Klug, Wilmington, Del., assignor to Hercules Incorporated, a corporation of Delaware
No Drawing. Filed Feb. 8, 1963, Ser. No. 257,061
8 Claims. (Cl. 260—231)

The present invention relates to an improved process of preparing hydroxypropyl cellulose having unexpected beneficial properties.

In copending application Serial No. 257,064, entitled Hydroxypropyl Cellulose and Process, filed on even date herewith in the name of Eugene D. Klug as inventor, there is described and claimed the hydroxypropyl cellulose products of the present invention and another process of making same. The process of said copending application comprises mixing cellulosic material with aqueous alkali in the presence of a diluent, e.g. tertiary butyl alcohol, removing excess liquid from the resulting alkali cellulose and then causing the alkali cellulose to react with propylene oxide either in the presence or absence of a second diluent, e.g. hexane. As pointed out in said copending application, the etherification diluents serve more as a means in aiding the control of the etherification temperature, and for this same reason one may use in the present invention the same etherification or "second" diluents of said copending application.

Although the process of said copending application is quite satisfactory, it would be a substantial process improvement from the standpoint of diluent recovery if a way could be found to carry out the process without using a diluent as such.

In accordance with the present invention a way has been found of causing the propylene oxide to serve the dual function of a diluent in the alkali cellulose step and a diluent and etherification agent in the subsequent etherification of the resulting alkali cellulose. More specifically, in accordance with the present invention said hydroxypropyl cellulose is prepared by carrying out the process which comprises mixing cellulosic material, alkali, a small amount of water and excess liquid propylene oxide, and then causing the alkali cellulose to react with a portion of the propylene oxide in the presence of the remainder of the excess liquid propylene oxide as a diluent, the liquid propylene oxide serving as the only diluent in the process. Alternatively, excess liquid (primarily propylene oxide) may be removed (e.g. by filtering or centrifuging) after the alkali cellulose period and the resulting alkali cellulose caused to react with the remaining propylene oxide either in the presence or absence of a second diluent, e.g. hexane. Preferably excess liquid is removed to a press ratio of 2.5–8 and the alkali/cellulose ratio is .02–5. According to specifically preferred conditions excess liquid is removed from the alkali cellulose to a press ratio of 3.5–5 and the alkali/cellulose ratio is .05–.15. By removing "excess" liquid from the alkali cellulose after the alkali cellulose period and before the hydroxypropylation reaction, is meant that the liquid is removed to a press ratio of 2.5–8 and preferably to a press ratio of 3.5–5. "Press ratio," as is well understood in the art, is the ratio of the weight of the alkali cellulose after removing excess liquid to the air-dry weight of the starting cellulosic material. Since the excess liquid is usually removed by filtration or centrifugation, press ratio is usually expressed as the ratio of the weight of the resulting filter cake to the weight of the cellulose.

Thus one of the chief differences between the present invention and the invention described and claimed in said copending application is the use of liquid propylene oxide to serve as a diluent in the alkali cellulose period and as a diluent and etherification agent during the subsequent etherification period. This is a very important feature of the present invention, particularly from a commercial standpoint, since it reduces the number of materials to separate and recover. The fact that in the present invention no other diluent is used in the alkali cellulose step other than the liquid propylene oxide which is required as an etherification agent in the subsequent etherification step, substantially eliminates any recovery problems. As disclosed hereinbefore and as shown by the examples hereinafter, the propylene oxide remaining after the alkali cellulose period which is in excess of that required in the subsequent etherification may be recovered or it may be left in to serve as an etherification diluent and then recovered.

One of the functions which the etherification diluent (e.g. hexane, propylene oxide, etc.) performs in the present invention is to make it easier to control the hydroxypropylation reaction which is exothermic, and it does this (1) by diluting the propylene oxide (e.g. when hexane is used) and thereby making it less reactive without adversely affecting the hydroxypropylation efficiency and (2) by absorbing the heat of the reaction and facilitating its transfer to the walls of the reaction vessel. When liquid propylene oxide is the etherification diluent, it enables efficient control of the etherification temperature by cooling due to evaporation and condensation of the propylene oxide. Thus the etherification diluent may be propylene oxide or any liquid which is substantially inert in the system and preferably which does not dissolve the hydroxypropyl cellulose product in the system to any substantial extent. Examples of liquids in addition to propylene oxide are ethers, aliphatic or aromatic or alicyclic hydrocarbons. More specifically such liquids include, e.g. dibutyl ether, diisopropyl ether, hexane, heptane, benzene, toluene, xylene and cyclohexane.

The purpose of the following two paragraphs is to explain the use herein and in the prior art of the term "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is genrally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The two most widely used methods for determining M.S. are the Zeisel-Morgan method and the terminal methyl method. The Zeisel-Morgan method is reported beginning at page 500, vol. 18, 1946, of Industrial and Engineering Chemistry, Analytical Edition. The terminal methyl method is reported by Lemieux and Purves beginning at page 485, vol. 25B, 1947, of Canadian Journal of Research. Still another accepted method is the percent carbon method, and it is so well known in the art that it needs no further identification. Some are of the opinion that perhaps the terminal methyl method is somewhat more accurate. However all those skilled in the art realize that it is quite difficult to obtain a high degree of accuracy in determining M.S. at high M.S. levels, and that the accuracy of neither of these methods is as high as desired. The M.S. values given hereinafter for Examples 1–3 were determined by the percent carbon method, and those for Examples 4–7 were determined by the terminal methyl method. This explanation is being given in order to make it clear that although the M.S. values herein may not be highly accurate, they were determined by the most accurate methods known.

Contrary to what the artisan would expect from the prior art, carrying out the process as disclosed hereinbefore gives a hydroxypropyl cellulose product which (1) has excellent solubility in water, (2) has excellent thermoplasticity, and (3) is also soluble in a large number of polar organic solvents. The M.S. of the hydroxypropyl cellulose has an important influence on these properties. Thus, as to water solubility, the temperature at which the hydroxypropyl cellulose becomes insoluble in water varies inversely with M.S. For instance the hydroxypropyl cellulose of M.S. 2 does not become insoluble in water until the water reaches a temperature of about 60° C., whereas the hydroxypropyl cellulose of M.S. 4 becomes insoluble in water when the water reaches a temperature of about 40° C. Stated in another way, the hydroxypropyl cellulose of M.S. 2 is soluble in water up to a temperature of about 60° C. but insoluble in water above a temperature of about 60° C. whereas the hydroxypropyl cellulose of M.S. 4 is soluble in water up to a temperature of about 40° C. but insoluble in water above a temperature of about 40° C. The thermoplasticity of the hydroxypropyl cellulose and its solubility in polar organic solvents vary directly with M.S. It also must be kept in mind that solubility in water and polar organic solvents, and degree of thermoplasticity vary inversely with viscosity. Thus, the M.S. desired will depend on the use to be made of the hydroxypropyl cellulose. For some uses, hydroxypropyl cellulose of relatively low M.S. is more desirable, whereas for other uses hydroxypropyl cellulose of higher M.S. is preferred.

An essential and very important condition of the present invention is the use of an unusually low alkali/cellulose ratio, namely 0.2–.5 and preferably .05–.5.

Still another necessary condition of the present invention is that the hydroxypropylation reaction be continued until the M.S. of the hydroxypropyl cellulose product has reached at least 2 and preferably 2–10. Particularly desirable for many uses is a hydroxypropyl cellulose product having an M.S. of 3–5.

A feature of the present process which is particularly attractive from a commercial standpoint is the ability to purify the hydroxypropyl cellulose product in hot water instead of the far more expensive organic purification solvents of the prior art. Notwithstanding this desirable property from a process standpoint, the hydroxypropyl cellulose product of the present invention is very soluble in cold water, the latter property being very desirable or necessary for many uses.

As mentioned hereinbefore, still another very attractive feature of the present invention from a commercial standpoint is the ability to carry out the process using the etherification agent (i.e. propylene oxide) as the diluent in the alkali cellulose period, and also if desired using propylene oxide in the etherification period as diluent and etherification agent, thereby eliminating the step of removing excess liquid at the end of the alkali cellulose step.

The following examples illustrate the present invention, but they are not intended to limit the present invention beyond the scope of the appended claims. In the examples and elsewhere herein percent and parts are by weight unless otherwise indicated. All viscosities given herein were determined with a standard Brookfield Synchro-Lectric LVF viscometer using an aqueous solution of the cellulose ethers of the concentration specified and at a temperature of 25° C.

EXAMPLES 1–3

In Examples 1–3 no diluent other than propylene oxide was used in the alkali cellulose period; in the etherification period either no diluent was used or excess propylene oxide was left in from the alkali cellulose period and used as diluent. Unless otherwise indicated the ratios given apply to both the alkali cellulose and the etherification period. The alkali/cellulose ratio was 0.3. The water/cellulose ratio was 1.6 in Examples 2 and 3 and in Example 1 it was 0.6 in the alkali cellulose period and .45 in the etherification period. The propylene oxide/cellulose ratio was 12.7 in all cases except for 3.56 in the etherification period in Example 1. The press ratio was 5.4 in Example 1. Of course there was no press ratio in Examples 2 and 3 because no excess liquid was removed from the alkali cellulose. In each case the etherification efficiency was good, i.e. 35% or better. In each case the 2% solution solubility of the hydroxypropyl cellulose product was good in both water and methanol at 25° C.

EXAMPLE 1

This example illustrates using propylene oxide as the diluent in the alkali cellulose period, filtering off the excess liquid (mostly propylene oxide) from the alkali cellulose, etherifying at 25° C. in the absence of a diluent.

0.6 part of 50% aqueous NaOH solution was added to 1 part wood pulp, 12.8 parts liquid propylene oxide and 0.3 part water and stirred for one hour at 4° C. The reaction mixture was cooled in an ice bath to minimize loss of propylene oxide by evaporation. Then the excess liquid propylene oxide was removed by filtration, leaving an alkali cellulose filter cake weighing 5.4 parts. The alkali cellulose filter cake was broken up and placed in a reaction vessel, the air being displaced from the vessel with nitrogen. The vessel was then tumbled at 25° C. for 50 hours.

The hydroxypropyl cellulose product was slurried in boiling water. The slurry was kept acidic to phenolphthalein by addition of 85% $H_3PO_4$ in small amounts as needed. The pH of the slurry was finally adjusted to 7.0, the product washed substantially free of salt impurities with hot water (85° C.–95° C.), the water decanted and the product dried at 130° C. using a two-roll drum drier. The hydroxypropyl cellulose product had an M.S. of 3.7 and a 2% aqueous Brookfield viscosity of 60 cps. at 25° C.

EXAMPLE 2

This example differs primarily from Example 1 in allowing the excess propylene oxide to remain in the alkali cellulose and serve as a diluent during etherification.

A slurry of 1 part wood pulp in 12.8 parts liquid propylene oxide and 1.3 parts water was stirred in a reaction vessel fitted with a reflux condenser. The vessel was immersed in an ice bath. With continued stirring, 0.6 part of 50% NaOH was added dropwise to the slurry and the temperature increased from 0° C. to 5° C. After the slurry had been stirred for one hour the temperature of the bath was 40° C. and the temperature of the reaction mixture was 36° C. Stirring was continued under reflux for 6 hours then the stirring was stopped, but refluxing was allowed to continue for an additional 16 hours.

The propylene oxide was distilled off from the reaction mixture by adding live steam to the vessel. The hydroxypropyl cellulose was recovered, purified and dried as in Example 1. It had an M.S. of 3.1 and a 2% aqueous Brookfield viscosity of 2040 cps. at 25° C.

EXAMPLE 3

This example differs primarily from Example 2 in employing a higher etherification temperature (i.e. 55° C. vs. 36° C.).

A slurry of 1 part wood pulp in 12.7 parts liquid propylene oxide and 1.3 parts water was stirred in a pressure reaction vessel cooled by an ice bath. 0.6 part of 50% aqueous NaOH solution was added dropwise and the slurry was stirred for an additional 24 minutes. Then the vessel was sealed and with continued stirring the temperature of the bath and of the slurry (reaction mixture) rose to 55° C. After stirring for 2.5 additional hours at a bath temperature of 55° C. the temperature of the reaction mixture was slightly higher than the bath temperature. Then the bath temperature was gradually lowered to 45° C. in order to hold the reaction temperature at about 55° C. The reaction was allowed to continue at 55° C. for 5.5 additional hours.

The hydroxypropyl cellulose product was recovered, purified and dried as in Example 1. It had an M.S. of 3.4 and a 2% aqueous Brookfield viscosity of 120 cps. at 25° C.

EXAMPLES 4–7

*Using inert etherification diluent*

These Examples 4–7 show using propylene oxide as the diluent in the alkali cellulose period (as in Examples 1–3), filtering off excess liquid (mostly propylene oxide) at end of alkali cellulose period and etherifying at 70° C. in presence of hexane as diluent. These Examples 4–7 also show the effect of water/cellulose ratio on reaction efficiency.

1 part wood pulp, 12.7 parts liquid propylene oxide and different amounts of water (see Table 1 hereinafter) were stirred together for 1 hour at 25° C. The reaction mixture was cooled in an ice bath to minimize loss of propylene oxide by evaporation. 0.2 part of 50% aqueous NaOH was added to the mixture. After stirring one hour, excess liquid (i.e. 10 cc. liquid per gram of pulp) was filtered off. The alkali cellulose filter cake was broken up and added to 7 parts hexane and heated at 70° C. for 16 hours in a pressure vessel (from which air had been displaced by nitrogen) while agitating. The hydroxypropyl cellulose product was a solid suspended in the hexane.

The excess hexane was filtered off and the filter cake was slurried in boiling water, the residual hexane flashing off. The hydroxypropyl cellulose products were recovered, purified and dried as in Example 1. Further details appear in Table 1 hereinafter.

applications, including e.g. non-curling rewettable adhesive formulations, paint remover formulations, thickeners, and the like.

As those skilled in this art will appreciate many variations may be made in the above conditions, within the scope of this invention defined in the appended claims.

The cellulosic material used in this invention may be any suitable source of reactive cellulosic material, such as cotton cellulose, purified cotton linters or wood pulp or others. Although not necessary in the practice of this invention, it is desirable to employ cellulose which has been comminuted to a particle size sufficiently small to pass through the openings in a standard 35-mesh sieve or screen. Such comminuted cellulose has the advantage that it can be readily and uniformly suspended in the liquid propylene oxide with substantially no tendency for the fibrous cellulosic particles to mat or felt together in the suspension or slurry into agglomerates. Moreover, the smaller the individual cellulosic particles are, the higher the percentage by weight of cellulose which can be suspended satisfactorily in the slurrying medium of this invention, up to a working limit of about 20% by weight of cellulose. Comminution may be accomplished by any suitable comminution means, such as knife mills, hammer mills, ball mills, paper beaters, Jordan engines, attrition mills, and others. If desired, however, ordinary shredded cotton linters or shredded wood pulp, or even staple cotton can be employed instead of comminuted cellulose. With shredded cellulose or staple cotton, however, the maximum amount of cellulose which can be satisfactorily suspended or slurried without encountering excessive matting together of fibers in the slurry is on the order of about 3.5% by weight of cellulose.

Various alkalies are applicable, including alkali metal hydroxides, e.g. sodium hydroxide, potassium hydroxide, and organic bases, e.g. trimethyl benzyl ammonium hydroxide, dimethyl dibenzyl ammonium hydroxide, tetramethyl ammonium hydroxide.

Various types of drying methods are applicable for drying the hydroxypropyl cellulose products of the present invention, e.g. drum drying, spray drying, superheated steam drying, and vented extruder drying.

Good results are obtained in accordance with this invention using a diluent/cellulose ratio of 5–20, preferably 8–12, in both the alkali cellulose period and ether-

TABLE 1

*Using hexane during etherification effect of water/cellulose ratio*

| Example | Ratio to Cellulose: | | | | | | | Press Ratio | M.S. | 2% Brookfield Viscosity in Water at 25° C. cps. | Etherification Efficiency Percent [1] | 2% Solubility at 25° C in: | |
|---|---|---|---|---|---|---|---|---|---|---|---|---|---|
| | Alkali Cellulose Period | | | Etherification Period | | | | | | | | | |
| | Water | Propylene Oxide | Alkali | Water | Propylene Oxide | Alkali | Hexane | | | | | Water | MeOH |
| 4 | 1.1 | 12.7 | 0.1 | 0.63 | 3.61 | 0.1 | 6.8 | 5.24 | 3.65 | 796 | 34.4 | Good | Fair. |
| 5 | 0.6 | 12.7 | 0.1 | 0.33 | 3.61 | 0.1 | 6.8 | 4.94 | 4.0 | 33 | 36.8 | Excellent | Excellent. |
| 6 | 0.35 | 12.7 | 0.1 | 0.21 | 3.62 | 0.1 | 6.8 | 4.83 | 5.1 | 126 | 46.6 | do | Do. |
| 7 | 0.10 | 12.7 | 0.1 | 0.06 | 3.41 | 0.1 | 6.8 | 4.47 | 4.26 | 1,012 | 42.0 | Good | Fair. |

[1] The formula for calculating etherification efficiency is: Etherification Efficiency $= 100 \times \dfrac{\text{M.S. Found}}{\dfrac{\text{Moles propylene oxide}}{\text{Moles cellulose}}}$ The hydroxypropyl cellulose made in accordance with the present invention was tested in substantially the same way disclosed in my copending application identified hereinbefore and found to possess substantially the same desirable properties of solubility in cold water and polar organic solvents, insolubility in hot water, thermoplasticity, low equilibrium moisture content, etc. Likewise by substantially the same tests carried out in my said copending application the unusual properties of the hydroxypropyl cellulose of the present invention were found to render it particularly desirable in a large number of ification period. However, as pointed out hereinbefore, it is not necessary to use a diluent in the etherification period. Good results are obtained in accordance with this invention using a water/cellulose ratio of 0.1–4, preferably 0.1–1, in the alkali cellulose period and 0.1–2, preferably 0.1–1, in the etherification period. As is conventional practice, the water given herein in the water/cellulose ratios includes the water added as such plus the water in the alkali, but does not include the water in the cellulose (usually about 5% based on the bone dry weight of the cellulose). Although there is no upper ratio of propylene oxide/cellulose which one could use during the etherification period, normally this ratio will be 1–20, preferably 2.5–12.

The order in which the several ingredients are brought together into contact with each other in the alkali cellulose period is immaterial. For example, part or all of the water and/or part or all of the alkali can be introduced into the diluent prior to mixing with the cellulose. On the other hand, if desired, the cellulose can be mixed with the diluent after which the alkali and water can be added, either separately in either order or together. If desired, part or all of the water can be mixed with the diluent prior to mixing with the cellulose, after which the alkali and any additional water can then be added, either together or separately in either order. If desired, the water can be added to the cellulose prior to mixing with the diluent, or the water may be distributed in any manner between the diluent, the cellulose and the alkali. The alkali may be added as solid caustic or in aqueous solution. If added as solid caustic, sufficient additional time is required for the caustic to dissolve in the water present in the system. A procedure sometimes used comprises preparing a diluent-water mixture and suspending a given weight of cellulose of known moisture content therein while agitating, after which a predetermined weight of an aqueous caustic alkali solution of known concentration is added to the system while continuing to agitate. The alkali cellulose time may vary widely, depending largely on temperature. Preferably the temperature of the alkali cellulose mixture will be maintained at about 0° C.–35° C. throughout an alkali cellulose period of about 5 minutes to 3 hours.

The etherification time and temperature may vary considerably within the scope of the present invention. Thus, for example, the etherification reaction can be carried out at a temperature of about 20° C.–150° C. for about 15 minutes to 48 hours. Preferably the etherification reaction will be carried out at a temperature of about 65° C.–95° C. for a period of about 5–16 hours. The time of the etherification reaction varies inversely with temperature, being relatively long at a low temperature such as 20° C. and being substantially shorter at a high temperature such as 150° C.

As disclosed hereinbefore the etherification reaction in the present invention is exothermic. Various means may be used to control the temperature, including e.g. the use of a diluent, reflux condenser on the reaction vessel, ice bath cooling, incremental introduction of the propylene oxide into the reaction vessel, etc., or combinations of these.

One of the outstanding advantages of the present invention is that it is quite easy to purify and recover the hydroxypropyl cellulose product. At the end of the etherification reaction the crude hydroxypropyl cellulose product appears in the reaction mixture in a somewhat swollen condition since it is swollen e.g. by such materials as cold water (below about 40° C.) and propylene glycol. Preferably, then, the first step in the purification process is to separate the product from the reaction mixture so that it can be more readily purified. A preferred method of separation is to add the reaction mixture to vigorously stirred hot water (preferably about 85° C.–95° C.). This precipitates the hydroxypropyl cellulose product and flashes off volatile materials which are recovered. This changes the product from a somewhat swollen condition to a granular easily handled material. Another separation method which has been found to work satisfactorily involves passing live steam through the reaction mixture followed by washing with hot water. Those skilled in the art will appreciate that various other techniques can be used to accomplish this separation. Purification by washing with hot water brings the granular hydroxypropyl cellulose product to almost a nil ash content. Washing the granular product by steeping and decanting has proven quite successful. Of course, any of the usual countercurrent washing procedures may also be used. Preferably the wash water temperature will be at least 70° C., and more specifically preferred is a wash water temperature of at least 85° C. If the wash water temperature is too low, the product is not as easily separated therefrom.

One of the materials used in the present process is an alkali which is a swelling agent and catalyst for the reaction. In the purification step after the etherification reaction has been completed, this alkali must be removed. It may be removed as such by hot water washing. However, it has been found to be more convenient to neutralize the alkali and wash out the resulting salts. As neutralizing agents any of the common acids may be used, e.g. phosphoric, acetic, hydrochloric, sulfuric or nitric acids. The best results have been obtained with phosphoric and acetic acids because better control may be obtained with these acids. Neutralization can be carried out on the crude reaction mixture or on the precipitated hydroxypropyl cellulose.

It is well known in the art how to obtain a water soluble cellulose ether of almost any desired viscosity within a very broad range of viscosities, and the usual techniques are applicable in the present invention. Viscosity reduction may be carried out at various stages, e.g. on the cellulosic material prior to any treatment in accordance with this invention, during the etherification reaction, on the crude hydroxypropyl cellulose product or on the final purified hydroxypropyl cellulose product. Suitable viscosity reduction agents include the hypohalites, such as the alkali metal hypobromites, hypochlorites and hypoiodites; peroxides, such as hydrogen peroxide and the alkali metal peroxides; periodates, such as the alkali metal periodates; and permanganate. Metal hypochlorites, such as the alkali metal and alkaline earth metal hypochlorites, are ordinarly used, but other inorganic hypochlorites such as ammonium hpyochlorite, can be used if desired. Generally the preferred hypochlorite is sodium hypochlorite primarily because of its commercial availability. The amount of hypochlorite that is used depends on the desired viscosity of the final product and the time of treatment, and this amount can be expressed in terms of the available chlorine content of the hypochlorite. The amount of hypochlorite that is used normally will be sufficient to provide about 0.1%–6% available chlorine based on the cellulose employed.

Conventional oxidation catalysts may also be used during the viscosity reduction, e.g. salts of cobalt, magnesium, iron, etc.

Of course, two variables which affect the viscosity reduction are treatment time and viscosity reduction agent concentration or ratio of viscosity reduction agent to cellulose ether. Treatment time and viscosity reduction agent concentration vary inversely. Also, elevated temperature enhances viscosity reduction efficiency and rate. Although viscosity reduction temperatures outside the range of 40° C.–100° C. are applicable, they are less practical. Thus, any viscosity needed is obtainable. Generally the viscosity of the hydroxypropyl cellulose for most uses will range from a 5% viscosity of about 25 cps. to a 1% viscosity of about 3000 cps.

Since they are well known in the art many of the variables disclosed herein are disclosed for the sake of clarity and completeness and not as limitations on the present invention. This applies to such variables e.g. as alkali cellulose and etherification time and temperature, the order of adding the reactants, the type of cellulosic material used and its physical state, the viscosity of the hydroxypropyl cellulose, viscosity reduction or control, the alkali used and its concentration.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing hydroxypropyl cellulose comprising mixing at a temperature of about 0° C.–35° C. cellulosic material, alkali and water in the presence of liquid propylene oxide as a diluent, and then allowing propylene oxide to react at a temperature of about 65° C.–150° C. with the alkali cellulose until the hydroxypropyl cellulose being produced reaches an M.S. of at least 2, the alkali/cellulose ratio being 0.02–0.5, the water/cellulose ratio being 0.1–4 and 0.1–2 in the alkali cellulose period and etherification period, respectively.

2. Process of preparing hydroxypropyl cellulose comprising mixing at a temperature of about 0°C.–35° C. cellulosic material, alkali and water in the presence of liquid propylene oxide as a diluent, and then allowing propylene oxide to react at a temperature of about 65° C.–150° C. with the alkali cellulose until the hydroxyropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

3. Process of preparing hydroxypropyl cellulose comprising mixing cellulosic material, alkali and water in the presence of liquid proylene oxide as a diluent, removing excess liquid from the alkali cellulose, and then allowing propylene oxide to react with the alkali cellulose until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

4. Process of preparing hydroxypropyl cellulose comprising mixing cellulosic material, alkali and water in the presence of liquid propylene oxide as a diluent, removing excess liquid from the alkali cellulose to a press ratio of 2.5–8, and then allowing proylene oxide to react with the alkali cellulose until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

5. Process of preparing hydroxypropyl cellulose comprising mixing cellulosic material, alkali and water in the presence of liquid proylene oxide as a diluent, removing excess liquid from the alkali cellulose to a press ratio of 2.5–8, and then allowing propylene oxide to react with the alkali cellulose in the presence of a diluent other than propylene oxide until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

6. Process of preparing hydroxypropyl cellulose comprising mixing cellulosic material, alkali and water in the presence of liquid propylene oxide as a diluent, removing excess liquid from the alkali cellulose to a press ratio of 3.5–5, and then allowing propylene oxide to react with the alkali cellulose in the presence of a liquid aliphatic hydrocarbon as a diluent until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

7. Process of preparing hydroxypropyl cellulose comprising mixing cellulosic material, alkali and water in the presence of liquid propylene oxide as a diluent, removing excess liquid from the alkali cellulose to a press ratio of 3.5–5, and then allowing propylene oxide to react with the alkali cellulose in the presence of heptane as a diluent until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

8. Process of preparing hydroxypropyl cellulose comprising mixture at a temperature of about 0° C.–35° C. cellulosic material, alkali and water in the presence of excess liquid propylene oxide as a diluent, then allowing a portion of the propylene oxide to react at a temperature of about 65° C.–150° C. with the alkali cellulose in the presence of the remainder of the propylene oxide serving as a diluent until the hydroxypropyl cellulose being produced reaches an M.S. of 3–5, the alkali/cellulose ratio being 0.05–0.15, the water/cellulose ratio being 0.1–4 and 0.1–2 in the alkali cellulose period and etherification period, respectively.

References Cited by the Examiner
UNITED STATES PATENTS

| | | | |
|---|---|---|---|
| 2,667,481 | 1/1954 | Tasker | 260—232 |
| 2,572,039 | 10/1951 | Klug | 260—231 |

LEON J. BERCOVITZ, *Primary Examiner.*

R. W. MULCAHY, *Assistant Examiner.*